(12) United States Patent
Kim

(10) Patent No.: US 12,365,221 B2
(45) Date of Patent: Jul. 22, 2025

(54) VEHICLE HVAC SYSTEM

(71) Applicants: HYUNDAI MOTOR COMPANY, Seoul (KR); KIA CORPORATION, Seoul (KR)

(72) Inventor: Kwang Min Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 136 days.

(21) Appl. No.: 18/507,375

(22) Filed: Nov. 13, 2023

(65) Prior Publication Data

US 2025/0010691 A1 Jan. 9, 2025

(30) Foreign Application Priority Data

Jul. 7, 2023 (KR) ........................ 10-2023-0088445

(51) Int. Cl.
*B60H 1/32* (2006.01)
*B60H 1/00* (2006.01)

(52) U.S. Cl.
CPC ....... *B60H 1/3227* (2013.01); *B60H 1/00278* (2013.01); *B60H 1/00885* (2013.01); *B60H 1/3228* (2019.05)

(58) Field of Classification Search
CPC .............. B60H 1/3227; B60H 1/00278; B60H 1/3228; B60H 2001/00949; B60H 2001/00307; B60H 2001/00928; B60H 2001/325; B60H 2001/3257; F25B 40/00
See application file for complete search history.

(56) References Cited

FOREIGN PATENT DOCUMENTS

DE 102019207203 A1 * 6/2020 ......... B60H 1/00278

* cited by examiner

*Primary Examiner* — Emmanuel E Duke
(74) *Attorney, Agent, or Firm* — MCDONNELL BOEHNEN HULBERT & BERGHOFF LLP

(57) ABSTRACT

A vehicle HVAC system includes a compressor, an interior condenser disposed on the downstream side of the compressor, a water-cooled heat exchanger disposed on the downstream side of the interior condenser, and configured to transfer heat between a refrigerant and a coolant circulating in a coolant system, an exterior heat exchanger disposed on the downstream side of the water-cooled heat exchanger, and configured to transfer heat between the refrigerant and ambient air; a refrigerant heat exchanger configured to transfer heat between the refrigerant discharged from the water-cooled heat exchanger and the refrigerant discharged from the interior condenser, and a first control valve located between the water-cooled heat exchanger and the interior condenser, and configured to allow the refrigerant discharged from the interior condenser to be directed to at least one of the water-cooled heat exchanger, the refrigerant heat exchanger, and the exterior heat exchanger.

15 Claims, 5 Drawing Sheets

VEHICLE HVAC SYSTEM

CROSS REFERENCE TO RELATED APPLICATIONS

This application is based on and claims the benefit of priority to Korean Patent Application No. 10-2023-0088445, filed on Jul. 7, 2023, in the Korean Intellectual Property Office, the disclosure of which is incorporated herein in its entirety by reference.

TECHNICAL FIELD

The present disclosure relates to a vehicle heating, ventilation, and air conditioning (HVAC) system, and more particularly, to a vehicle HVAC system designed to improve heating performance and/or dehumidification performance using a refrigerant, thereby increasing electric efficiency of an electric vehicle.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven using fuel cells or electricity as a power source and hybrid vehicles which are driven using an engine and a battery.

Electric vehicles or hybrid vehicles may include a heating, ventilation, and air conditioning (HVAC) system for air conditioning in a passenger compartment. The HVAC system may be configured to heat and cool the air in the passenger compartment for passenger comfort.

In order to ensure driving safety, electric vehicles or hybrid vehicles include a power electronics cooling system designed to maintain power electronic components of a power electronics system at appropriate temperatures, and a battery cooling system designed to maintain a battery at an appropriate temperature. The power electronics cooling system may cool the power electronic components such as an electric motor, an inverter, an on-board charger (OBC), and a low DC-DC converter (LDC), thereby keeping the power electronic components at their respective appropriate temperatures. The battery cooling system may cool the battery, thereby keeping the battery at its appropriate temperature.

A refrigerant circulating in the HVAC system of the electric vehicle may absorb heat from a power electronics coolant circulating in the power electronics cooling system through a water-cooled heat exchanger, and be evaporated.

However, in a condition in which the temperature of ambient air is relatively low (for example, −20° C.--5° C.), the temperature of the power electronics coolant may be relatively lowered, and accordingly the refrigerant may fail to sufficiently absorb heat from the power electronics coolant. As a result, the evaporation of the refrigerant may be reduced, and a suction pressure of a compressor may be lowered below a threshold pressure. When the suction pressure of the compressor is lower than the threshold pressure, efficiency of the compressor may be reduced, and accordingly RPM of the compressor may be lowered below threshold RPM or the compressor may stop. As a result, the coefficient of performance (COP) of the HVAC system may be degraded. As the heating of the passenger compartment with the use of the refrigerant is not performed, but the passenger compartment is only heated by an electric heater of the HVAC system, electric efficiency of the electric vehicle may be reduced.

In the HVAC system according to the related art, as the heat absorption of the refrigerant is reduced in a condition in which the ambient temperature is relatively low, the amount of evaporation of the refrigerant may be insufficient. Accordingly, the heating of the passenger compartment with the use of the refrigerant may not be smoothly performed due to the RPM reduction or stop of the compressor, and the passenger compartment may be heated by the electric heater so that the electric efficiency of the electric vehicle may be reduced.

While the HVAC system is operating in a heating and dehumidification mode to perform the heating of the passenger compartment and the dehumidification of the passenger compartment at the same time, the HVAC system may automatically control the temperature of the passenger compartment to reach a target temperature. When the temperature of the passenger compartment reaches the target temperature, RPM of a blower may be relatively reduced so that the rate of air blown into the passenger compartment may be relatively reduced. As the rate of air blown into the passenger compartment is reduced, an interior condenser of the HVAC system may fail to sufficiently release heat to the air, and accordingly condensation of the refrigerant in the interior condenser may be insufficient. When the condensation of the refrigerant is insufficient, the dehumidification of the passenger compartment may not be smoothly performed so that fogging may occur on glasses (windows, windshield) of the vehicle, and the suction pressure of the compressor may be increased to the threshold pressure or higher so that the compressor may be forcibly stopped to protect the compressor. When the compressor is forcibly stopped, the electric heater may operate to heat the passenger compartment so that the electric efficiency of the electric vehicle may be reduced.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle heating, ventilation, and air conditioning (HVAC) system designed to improve heating performance and/or dehumidification performance with the use of a refrigerant, thereby increasing electric efficiency of an electric vehicle.

According to an aspect of the present disclosure, a vehicle HVAC system may include a compressor, an interior condenser positioned on a downstream side of the compressor, a water-cooled heat exchanger positioned on a downstream side of the interior condenser, the water-cooled heat exchanger being configured to transfer heat between a refrigerant and a coolant circulating in a coolant system, an exterior heat exchanger positioned on a downstream side of the water-cooled heat exchanger, the exterior heat exchanger being configured to transfer heat between the refrigerant and ambient air, a refrigerant heat exchanger configured to transfer heat between the refrigerant discharged from the water-cooled heat exchanger and the refrigerant discharged from the interior condenser, and a first control valve located between the water-cooled heat exchanger and the interior condenser, the first control valve being configured to allow the refrigerant discharged from the interior condenser to be directed to at least one of the water-cooled heat exchanger, the refrigerant heat exchanger, and the exterior heat exchanger.

The refrigerant heat exchanger may include a first passage through which the refrigerant discharged from the water-cooled heat exchanger passes, and a second passage through which the refrigerant discharged from at least one of the interior condenser and the exterior heat exchanger passes.

The vehicle HVAC system may further include a first bypass line configured to allow at least a portion of the refrigerant discharged from the interior condenser to be directed from an upstream point of the water-cooled heat exchanger to a downstream point of the exterior heat exchanger. The first bypass line may be fluidly connected to the second passage of the refrigerant heat exchanger.

The vehicle HVAC system may further include a second bypass line configured to allow at least a portion of the refrigerant discharged from the interior condenser to be directed from the upstream point of the water-cooled heat exchanger to an upstream point of the exterior heat exchanger. The second bypass line may be fluidly connected to an inlet of the exterior heat exchanger.

The first control valve may include an inlet port communicating with the interior condenser, a first outlet port communicating with the water-cooled heat exchanger, a second outlet port communicating with the first bypass line, and a third outlet port communicating with the second bypass line.

The opening degree of the first outlet port may be adjusted based on a discharge pressure and a discharge temperature of the compressor.

The vehicle HVAC system may further include a third bypass line configured to allow at least a portion of the refrigerant discharged from the water-cooled heat exchanger to be directed from an upstream point of the exterior heat exchanger to an upstream point of the compressor. The third bypass line may be fluidly connected to an inlet of the first passage of the refrigerant heat exchanger.

The vehicle HVAC system may further include a second control valve configured to allow the refrigerant discharged from the water-cooled heat exchanger to be directed to at least one of the exterior heat exchanger and the first passage of the refrigerant heat exchanger.

The second control valve may include: an inlet port communicating with the water-cooled heat exchanger; a first outlet port communicating with the exterior heat exchanger; and a second outlet port communicating with the third bypass line.

The vehicle HVAC system may further include a check valve positioned between the exterior heat exchanger and the second passage of the refrigerant heat exchanger. The check valve may be configured to allow the refrigerant to flow from the exterior heat exchanger to the second passage of the refrigerant heat exchanger, and to prevent the refrigerant from flowing backward from the second passage of the refrigerant heat exchanger to the exterior heat exchanger.

The vehicle HVAC system may further include a cooling-side expansion valve positioned on a downstream side of the second passage of the refrigerant heat exchanger, an evaporator positioned on a downstream side of the cooling-side expansion valve, a distribution line configured to allow at least a portion of the refrigerant discharged from the second passage of the refrigerant heat exchanger to be directed from an upstream point of the cooling-side expansion valve to a downstream point of the evaporator, and a battery chiller fluidly connected to the distribution line, and thermally connected to a battery cooling system.

The vehicle HVAC system may further include a third control valve configured to allow the refrigerant discharged from the second passage of the refrigerant heat exchanger to be directed to at least one of the cooling-side expansion valve and the battery chiller.

The third control valve may include an inlet port communicating with the second passage of the refrigerant heat exchanger, a first outlet port communicating with the cooling-side expansion valve, and a second outlet port communicating with the distribution line.

The opening degree of the first outlet port may be adjusted based on a discharge pressure of the compressor.

The opening degree of the second outlet port may be adjusted based on a suction pressure of the compressor.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
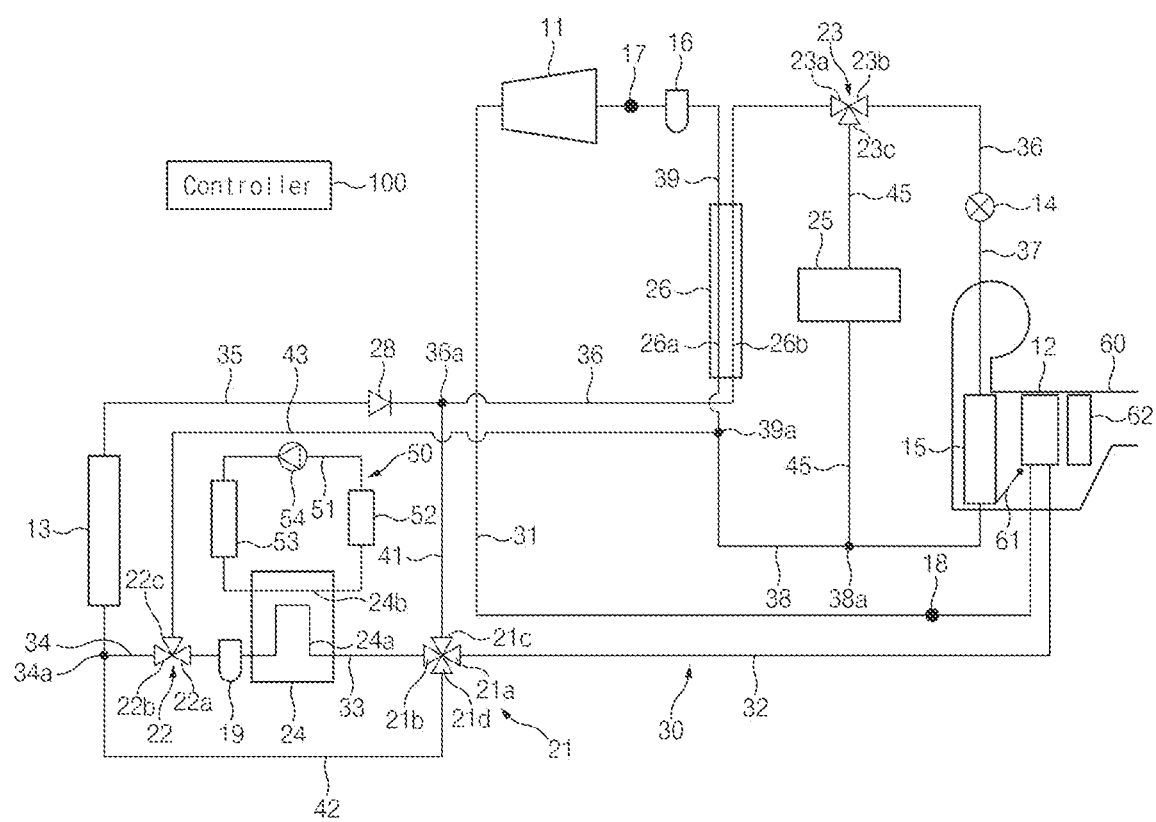
FIG. 1 illustrates a vehicle heating, ventilation, and air conditioning (HVAC) system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle heating, ventilation, and air conditioning (HVAC) system according to an exemplary embodiment of the present disclosure may be configured to heat and cool air in a passenger compartment of the vehicle through a phase change of a circulating refrigerant. The HVAC system may include a refrigerant circulation path 30 through which the refrigerant is allowed to circulate, and an HVAC case 60. The refrigerant circulation path 30 may be fluidly connected to a compressor 11, an interior condenser 12, a water-cooled heat exchanger 24, an exterior heat exchanger 13, a cooling-side expansion valve 14, and an evaporator 15. The refrigerant circulation path 30 may allow the flow of the refrigerant to vary depending on various operating modes of a vehicle thermal management system.

The compressor 11 may compress the refrigerant and allow the refrigerant to circulate. In particular, the compressor 11 may be configured to compress the refrigerant received from the evaporator 15 and/or a battery chiller 25. The compressor 11 may include a compressor motor and a compression section operated by the compressor motor. The refrigerant circulation path 30 may be fluidly connected to the compression section of the compressor 11.

The HVAC system may include an accumulator 16 disposed on the upstream side of the compressor 11. The accumulator 16 may be located between the evaporator 15 and the compressor 11, and the accumulator 16 may separate a liquid refrigerant from the refrigerant which is received from the evaporator 15, thereby preventing the liquid refrigerant from flowing into the compressor 11.

The interior condenser 12 may be configured to condense the refrigerant received from the compressor 11, and accordingly the air passing by the interior condenser 12 may be heated by the interior condenser 12. As the air heated by the interior condenser 12 is directed into the passenger compartment, the passenger compartment may be heated.

The water-cooled heat exchanger 24 may be disposed on the downstream side of the interior condenser 12. The water-cooled heat exchanger 24 may be thermally connected to a coolant system 50. The water-cooled heat exchanger 24 may be configured to transfer heat between a coolant circulating in the coolant system 50 and the refrigerant circulating in the refrigerant circulation path 30.

According to an exemplary embodiment, the coolant system 50 may be a power electronics cooling system configured to cool a power electronic component 52. The coolant system 50 may include a coolant circulation path 51 through which the coolant circulates, the power electronic component 52 fluidly connected to the coolant circulation path 51, a power electronic radiator 53 fluidly connected to the coolant circulation path 51, and a pump 54. The power electronic component may be an electric motor, an inverter, and a power conversion component. The power electronic radiator 53 may be disposed adjacent to a front grille of the vehicle, and the coolant passing through the power electronic radiator 53 may be cooled by the ambient air forcibly blown by a cooling fan. The power electronic component may have a coolant passage provided inside or outside thereof, and the coolant may pass through the coolant passage. The coolant passage of the power electronic component may be fluidly connected to the coolant circulation path 51.

The water-cooled heat exchanger 24 may include a first passage 24a fluidly connected to the refrigerant circulation path 30, and a second passage 24b fluidly connected to the coolant circulation path 51. When the temperature of the power electronic component increases, the coolant may absorb heat from the power electronic component so that the temperature of the coolant may relatively increase. The refrigerant passing through the first passage 24a may absorb heat from the coolant passing through the second passage 24b, and accordingly the refrigerant may be evaporated in the water-cooled heat exchanger 24.

The HVAC system according to an exemplary embodiment of the present disclosure may further include a receiver dryer 19 disposed on the downstream side of the water-cooled heat exchanger 24. The receiver dryer 19 may absorb moisture contained in the refrigerant discharged from the water-cooled heat exchanger 24, and store it to smoothly supply the refrigerant. The receiver dryer 19 may be adjacent to an outlet of the first passage 24a of the water-cooled heat exchanger 24.

The exterior heat exchanger 13 may be disposed on the downstream side of the first passage 24a of the water-cooled heat exchanger 24. The exterior heat exchanger 13 may have a refrigerant passage provided therein, and the refrigerant may pass through the coolant passage. The exterior heat exchanger 13 may be disposed adjacent to the front grille of the vehicle, and the exterior heat exchanger 13 may be exposed to the outside. The exterior heat exchanger 13 may be configured to transfer heat between the refrigerant and the ambient air. During a cooling operation of the HVAC system, the exterior heat exchanger 13 may be configured to condense the refrigerant received from the interior condenser 12. That is, the exterior heat exchanger 13 may serve as an exterior condenser that condenses the refrigerant by allowing the refrigerant to release heat to the ambient air during the cooling operation of the HVAC system. During a heating operation of the HVAC system, the exterior heat exchanger 13 may be configured to evaporate the refrigerant received from the water-cooled heat exchanger 24. That is, the exterior heat exchanger 13 may serve as an exterior evaporator that evaporates the refrigerant by allowing the refrigerant to absorb heat from the ambient air during the heating operation of the HVAC system. In particular, the exterior heat exchanger 13 may exchange heat with the ambient air forcibly blown by the cooling fan so that a heat transfer rate between the refrigerant and the ambient air may be further increased.

The HVAC system according to an exemplary embodiment of the present disclosure may include a refrigerant heat exchanger 26 disposed on the upstream side of the compressor 11. The refrigerant heat exchanger 26 may be configured to transfer heat between the refrigerant discharged from the first passage 24a of the water-cooled heat exchanger 24 and/or the evaporator 15 and the refrigerant discharged from the exterior heat exchanger 13 and/or the interior condenser 12. The refrigerant heat exchanger 26 may include a first passage 26a through which the refrigerant discharged from the evaporator 15 and/or the first passage 24a of the water-cooled heat exchanger 24 passes, and a second passage 26b through which the refrigerant discharged from the exterior heat exchanger 13 and/or the interior condenser 12 passes. The first passage 26a and the second passage 26b may be fluidly separated from each other.

An inlet of the first passage 26a may be located on the downstream side of the first passage 24a of the water-cooled heat exchanger 24 and an outlet of the evaporator 15, and accordingly the refrigerant discharged from the first passage 24a of the water-cooled heat exchanger 24 and the outlet of the evaporator 15 may be directed to the inlet of the first passage 26a.

An outlet of the first passage 26a may be located on the upstream side of the compressor 11, and accordingly the refrigerant discharged from the outlet of the first passage 26a may be directed to an inlet of the compressor 11.

An inlet of the second passage 26b may be located on the downstream side of an outlet of the exterior heat exchanger 13 and a first bypass line 41, and accordingly the refrigerant discharged from the exterior heat exchanger 13 and/or the interior condenser 12 may be directed to the inlet of the second passage 26b.

An outlet of the second passage 26b may be located on the upstream side of the cooling-side expansion valve 14, and accordingly the refrigerant discharged from the outlet of the second passage 26b may be directed to an inlet of the cooling-side expansion valve 14.

The refrigerant heat exchanger 26 may be configured to transfer heat between the refrigerant passing through the first passage 26a and the refrigerant passing through the second passage 26b. A temperature of the high-pressure refrigerant discharged from the interior condenser 12 may be higher than a temperature of the low-pressure refrigerant discharged from the first passage 24a of the water-cooled heat exchanger 24. Accordingly, the refrigerant passing through the first passage 26a may absorb heat from the refrigerant passing through the second passage 26b.

The HVAC system according to an exemplary embodiment of the present disclosure may further include a distribution line 45 configured to allow at least a portion of the refrigerant discharged from the second passage 26b of the refrigerant heat exchanger 26 to be directed from an upstream point of the cooling-side expansion valve 14 to a downstream point 38a of the evaporator 15.

The distribution line 45 may connect a point between the outlet of the exterior heat exchanger 13 and the inlet of the cooling-side expansion valve 14 to the point 38a between an outlet of the evaporator 15 and the inlet of the compressor 11. Specifically, an inlet of the distribution line 45 may be connected to the refrigerant circulation path 30 between the second passage 26b of the refrigerant heat exchanger 26 and the inlet of the cooling-side expansion valve 14, and an outlet of the distribution line 45 may be connected to the refrigerant circulation path 30 between the outlet of the evaporator 15 and the first passage 26a of the refrigerant heat exchanger 26. At least a portion of the refrigerant discharged from the exterior heat exchanger 13 may bypass the cooling-side expansion valve 14 and the evaporator 15 through the distribution line 45, and be directed to the compressor 11. That is, the distribution line 45 may be configured to allow at least a portion of the refrigerant discharged from the exterior heat exchanger 13 to bypass the cooling-side expansion valve 14 and the evaporator 15.

The battery chiller 25 may be fluidly connected to the distribution line 45, and the battery chiller 25 may be configured to transfer heat between the distribution line 45 and a battery cooling system (not shown). The battery cooling system may be configured to allow a coolant exchanging heat with a battery to circulate. The battery chiller 25 may be configured to transfer heat between the refrigerant passing through the distribution line 45 and the coolant circulating in the battery cooling system. That is, the battery chiller 25 may be thermally connected to the battery cooling system and the distribution line 45.

The battery chiller 25 may include a first passage fluidly connected to the distribution line 45, and a second passage fluidly connected to a battery coolant circulation path of the battery cooling system. According to an exemplary embodiment, the battery chiller 25 may be configured to transfer heat between the refrigerant passing through the first passage of the battery chiller 25 and the battery coolant passing through the second passage of the battery chiller 25. The refrigerant may absorb heat from the battery coolant so that it may be evaporated, and the battery coolant may release heat to the refrigerant so that it may be cooled.

The cooling-side expansion valve 14 may be disposed on the downstream side of the exterior heat exchanger 13 and the second passage 26b of the refrigerant heat exchanger 26, and the cooling-side expansion valve 14 may be disposed between the second passage 26b of the refrigerant heat exchanger 26 and the evaporator 15 in the refrigerant circulation path 30. The cooling-side expansion valve 14 may be disposed on the upstream side of the evaporator 15, and adjust the flow of the refrigerant and/or the flow rate of the refrigerant into the evaporator 15. During the cooling operation of the HVAC system, the cooling-side expansion valve 14 may be configured to expand the refrigerant received from the exterior heat exchanger 13. According to an exemplary embodiment, the cooling-side expansion valve 14 may be a thermal expansion valve (TXV) which senses the temperature and/or pressure of the refrigerant and adjusts the opening degree of the cooling-side expansion valve 14.

The evaporator 15 may be disposed on the downstream side of the cooling-side expansion valve 14, and receive the refrigerant expanded by the cooling-side expansion valve 14. The evaporator 15 may be configured to cool the air using the refrigerant received from the cooling-side expansion valve 14. That is, the refrigerant expanded by the cooling-side expansion valve 14 may absorb heat from the air and be evaporated in the evaporator 15. During the cooling operation of the HVAC system, the evaporator 15 may be configured to cool the air using the refrigerant cooled by the exterior heat exchanger 13 and expanded by the cooling-side expansion valve 14 and the air cooled by the refrigerant may be directed into the passenger compartment.

The HVAC system according to an exemplary embodiment of the present disclosure may include a low-pressure refrigerant sensor 17 disposed on the upstream side of the compressor 11 and adjacent to the inlet of the compressor 11, and a high-pressure refrigerant sensor 18 disposed on the downstream side of the compressor 11 and adjacent to an outlet of the compressor 11.

The low-pressure refrigerant sensor 17 may sense the pressure and temperature of the low-pressure refrigerant flowing into the inlet of the compressor 11. That is, the low-pressure refrigerant sensor 17 may sense a suction pressure and suction temperature of the compressor 11. In addition, the degree of superheat of the refrigerant may be determined based on the pressure and temperature of the low-pressure refrigerant sensed by the low-pressure refrigerant sensor 17. For example, the low-pressure refrigerant sensor 17 may be located between the inlet of the compressor 11 and the accumulator 16.

The high-pressure refrigerant sensor 18 may sense the pressure and temperature of the high-pressure refrigerant discharged from the outlet of the compressor 11. That is, the high-pressure refrigerant sensor 18 may sense a discharge pressure and discharge temperature of the compressor 11. For example, the high-pressure refrigerant sensor 18 may be located between the outlet of the compressor 11 and the interior condenser 12.

The HVAC case 60 may have an inlet and an outlet, and the HVAC case 60 may be configured to allow the air to be directed toward the passenger compartment of the vehicle. The evaporator 15 and the interior condenser 12 may be located inside the HVAC case 60. An air mixing door 61 may be disposed between the evaporator 15 and the interior condenser 12, and an electric heater 62 such as a positive temperature coefficient (PTC) heater may be disposed on the downstream side of the interior condenser 12 in an air flow direction.

The HVAC system according to an exemplary embodiment of the present disclosure may further include the first bypass line 41 configured to allow at least a portion of the refrigerant discharged from the interior condenser 12 to be directed from an upstream point of the first passage 24a of the water-cooled heat exchanger 24 to a downstream point 36a of the exterior heat exchanger 13. The first bypass line 41 may be fluidly connected to the inlet of the second passage 26b of the refrigerant heat exchanger 26. The first bypass line 41 may connect a point between an outlet of the interior condenser 12 and an inlet of the water-cooled heat exchanger 24 to the point 36a between the outlet of the exterior heat exchanger 13 and the inlet of the cooling-side expansion valve 14. Accordingly, the refrigerant passing through the first bypass line 41 may bypass the water-cooled heat exchanger 24 and the exterior heat exchanger 13, and be directed to the cooling-side expansion valve 14. That is, the first bypass line 41 may be configured to allow at least a portion of the refrigerant discharged from the interior condenser 12 to bypass the water-cooled heat exchanger 24 and the exterior heat exchanger 13.

The HVAC system according to an exemplary embodiment of the present disclosure may further include a second bypass line 42 configured to allow at least a portion of the refrigerant discharged from the interior condenser 12 to be directed from the upstream point of the first passage 24a of the water-cooled heat exchanger 24 to an upstream point 34a of the exterior heat exchanger 13. The second bypass line 42 may be fluidly connected to an inlet of the exterior heat exchanger 13. The second bypass line 42 may connect a point between the outlet of the interior condenser 12 and the first passage 24a of the water-cooled heat exchanger 24 to a point between the inlet of the exterior heat exchanger 13 and the first passage 24a of the water-cooled heat exchanger 24. The refrigerant passing through the second bypass line 42 may bypass the first passage 24a of the water-cooled heat exchanger 24, and be directed to the exterior heat exchanger 13. That is, the second bypass line 42 may be configured to allow at least a portion of the refrigerant discharged from the interior condenser 12 to bypass the water-cooled heat exchanger 24.

The HVAC system according to an exemplary embodiment of the present disclosure may include a first control valve 21 located between the water-cooled heat exchanger 24, the interior condenser 12, the first bypass line 41, and the second bypass line 42. The first control valve 21 may be configured to control the flow of the refrigerant (the direction of the refrigerant, the flow rate of the refrigerant, etc.) between the interior condenser 12, the first passage 24a of the water-cooled heat exchanger 24, the second passage 26b of the refrigerant heat exchanger 26, and the exterior heat exchanger 13. Specifically, the first control valve 21 may be configured to control the flow of the refrigerant in a manner that allows the refrigerant discharged from the interior condenser 12 to be directed toward at least one of the first passage 24a of the water-cooled heat exchanger 24, the second passage 26b of the refrigerant heat exchanger 26, and the exterior heat exchanger 13.

The first control valve 21 may include an inlet port 21a communicating with the interior condenser 12, a first outlet port 21b communicating with the first passage 24a of the water-cooled heat exchanger 24, a second outlet port 21c communicating with the first bypass line 41, and a third outlet port 21d communicating with the second bypass line 42.

The inlet port 21a may receive the refrigerant discharged from the interior condenser 12.

The opening degree of the first outlet port 21b may be adjusted by a controller 100 so that the refrigerant may be expanded through the first outlet port 21b and the flow rate of the refrigerant into the water-cooled heat exchanger 24 may be adjusted. When the opening degree of the first outlet port 21b is adjusted, the refrigerant may be expanded at the first outlet port 21b, and the expanded refrigerant may be directed to the water-cooled heat exchanger 24.

According to an exemplary embodiment, the opening degree of the first outlet port 21b may be adjusted based on the pressure (the discharge pressure of the compressor 11) and temperature (the discharge temperature of the compressor 11) of the high-pressure refrigerant sensed by the high-pressure refrigerant sensor 18. As the opening degree of the first outlet port 21b is adjusted to a predetermined degree, the refrigerant discharged from the first outlet port 21b may be expanded, and the pressure and temperature of the refrigerant discharged from the first outlet port 21b may be reduced. In particular, when the HVAC system operates in a heating mode, the opening degree of the first outlet port 21b may be adjusted based on the discharge pressure and discharge temperature of the compressor 11 so that the first outlet port 21b may serve as a heating-side expansion valve that expands the refrigerant directed to the water-cooled heat exchanger 24.

According to another exemplary embodiment, the opening degree of the first outlet port 21b may be adjusted based on the degree of superheat of the refrigerant, and the controller 100 may determine the degree of superheat of the refrigerant based on the pressure and temperature of the refrigerant sensed by the low-pressure refrigerant sensor 17. Specifically, when the opening degree of the first outlet port 21b is adjusted based on the pressure (the suction pressure of the compressor 11) and temperature (the suction temperature of the compressor 11) of the low-pressure refrigerant sensed by the low-pressure refrigerant sensor 17, the refrigerant discharged from the first outlet port 21b may be expanded, and the pressure and temperature of the refrigerant discharged from the first outlet port 21b may be reduced. In particular, when the HVAC system operates in the heating mode, the opening degree of the first outlet port 21b may be adjusted so that the first outlet port 21b may serve as a heating-side expansion valve that expands the refrigerant directed to the water-cooled heat exchanger 24.

In addition, the first outlet port 21b may be fully opened or be fully closed. When the first outlet port 21b is fully opened, the refrigerant may be directed to the water-cooled heat exchanger 24 without expanding.

The opening degree of the second outlet port 21c may be adjusted by the controller 100, and an inlet of the first bypass line 41 may be directly connected to the second outlet port 21c. The second outlet port 21c may be opened or closed by the controller 100 based on whether the HVAC system operates in a heating boost mode or heating enhanced mode. When the HVAC system operates in the heating boost mode or heating enhanced mode, the second outlet port 21c may be opened so that at least a portion of the refrigerant discharged from the interior condenser 12 may be directed to the first bypass line 41.

An inlet of the second bypass line 42 may be directly connected to the third outlet port 21d, and the third outlet port 21d may be opened or closed by the controller 100 based on whether the HVAC system operates in a dehumidification boost mode or dehumidification enhanced mode. When the HVAC system operates in the dehumidification boost mode or dehumidification enhanced mode, the third outlet port 21d may be opened so that at least a portion of the refrigerant discharged from the interior condenser 12 may be directed to the second bypass line 42.

The HVAC system according to an exemplary embodiment of the present disclosure may further include a third bypass line 43 configured to allow at least a portion of the refrigerant discharged from the first passage 24a of the water-cooled heat exchanger 24 to be directed from an upstream point of the exterior heat exchanger 13 to an upstream point of the compressor 11.

The third bypass line 43 may be fluidly connected to the first passage 26a of the refrigerant heat exchanger 26. The third bypass line 43 may connect a point between the outlet of the first passage 24a of the water-cooled heat exchanger 24 and the inlet of the exterior heat exchanger 13 to an upstream point 39a of the compressor 11. At least a portion of the refrigerant discharged from the first passage 24a of the water-cooled heat exchanger 24 may bypass the exterior heat exchanger 13 through the third bypass line 43.

The HVAC system according to an exemplary embodiment of the present disclosure may include a second control valve 22 located between the water-cooled heat exchanger 24, the exterior heat exchanger 13, and the third bypass line 43. The second control valve 22 may be configured to control the flow of the refrigerant (the direction of the refrigerant, the flow rate of the refrigerant, etc.) between the first passage 24a of the water-cooled heat exchanger 24, the exterior heat exchanger 13, and the first passage 26a of the refrigerant heat exchanger 26. Specifically, the second control valve 22 may be configured to control the flow of the refrigerant in a manner that allows the refrigerant discharged from the first passage 24a of the water-cooled heat exchanger 24 to be directed to at least one of the exterior heat exchanger 13 and the first passage 26a of the refrigerant heat exchanger 26.

The second control valve 22 may include an inlet port 22a communicating with the water-cooled heat exchanger 24, a first outlet port 22b communicating with the exterior heat exchanger 13, and a second outlet port 22c communicating with the third bypass line 43. The second outlet port 22c may communicate with the first passage 26a of the refrigerant heat exchanger 26 through the third bypass line 43.

The second control valve 22 may be switched to allow the inlet port 22a to communicate with at least one of the first outlet port 22b and the second outlet port 22c. For example, when the second control valve 22 is switched to allow the inlet port 22a to communicate with the second outlet port 22c, the refrigerant discharged from the first passage 24a of the water-cooled heat exchanger 24 may be directed to the first passage 26a of the refrigerant heat exchanger 26 and the compressor 11 through the third bypass line 43. That is, the refrigerant may bypass the exterior heat exchanger 13 and circulate through the third bypass line 43. When the second control valve 22 is switched to allow the inlet port 22a to communicate with the first outlet port 22b, the refrigerant discharged from the water-cooled heat exchanger 24 may be directed to the exterior heat exchanger 13 without passing through the third bypass line 43.

The HVAC system may include a third control valve 23 located between the second passage 26b of the refrigerant heat exchanger 26, the cooling-side expansion valve 14, and the distribution line 45. The third control valve 23 may be configured to control the flow of the refrigerant (the direction of the refrigerant, the flow rate of the refrigerant, etc.) between the second passage 26b of the refrigerant heat exchanger 26, the cooling-side expansion valve 14, and the battery chiller 25. Specifically, the third control valve 23 may control the flow of the refrigerant in a manner that allows the refrigerant discharged from the second passage 26b of the refrigerant heat exchanger 26 to be directed to at least one of the cooling-side expansion valve 14 and the battery chiller 25.

The third control valve 23 may include an inlet port 23a communicating with the second passage 26b of the refrigerant heat exchanger 26, a first outlet port 23b communicating with the cooling-side expansion valve 14, and a second outlet port 23c communicating with the distribution line 45.

The inlet port 23a may receive the refrigerant discharged from the second passage 26b of the refrigerant heat exchanger 26.

The opening degree of the first outlet port 23b may be adjusted based on the pressure (the discharge pressure of the compressor 11) and temperature (the discharge temperature of the compressor 11) of the high-pressure refrigerant sensed by the high-pressure refrigerant sensor 18. As the opening degree of the first outlet port 23b is adjusted, the flow rate of the refrigerant into the cooling-side expansion valve 14 may be adjusted. In addition, the first outlet port 23b may be fully opened or be fully closed so that the first outlet port 23b may serve as a shut-off valve located on the upstream side of the cooling-side expansion valve 14.

When the first outlet port 23b is fully closed, the refrigerant may only be directed to the battery chiller 25 without being directed to the cooling-side expansion valve 14 and the evaporator 15. That is, when the first outlet port 23b is fully closed, the cooling operation of the HVAC system may not be performed, and only the battery chiller 25 may be cooled or the heating operation of the HVAC system may be performed. When the first outlet port 23b is fully opened, the refrigerant may be directed to the cooling-side expansion valve 14 and the evaporator 15. That is, when the first outlet port 23b is opened to a predetermined degree, the heating or dehumidification of the passenger compartment may be performed.

The inlet of the distribution line 45 may be directly connected to the second outlet port 23c. The opening degree of the second outlet port 23c may be adjusted according to the state (pressure, temperature, etc.) of the refrigerant, the temperature of the battery, and the like.

Figure 3:
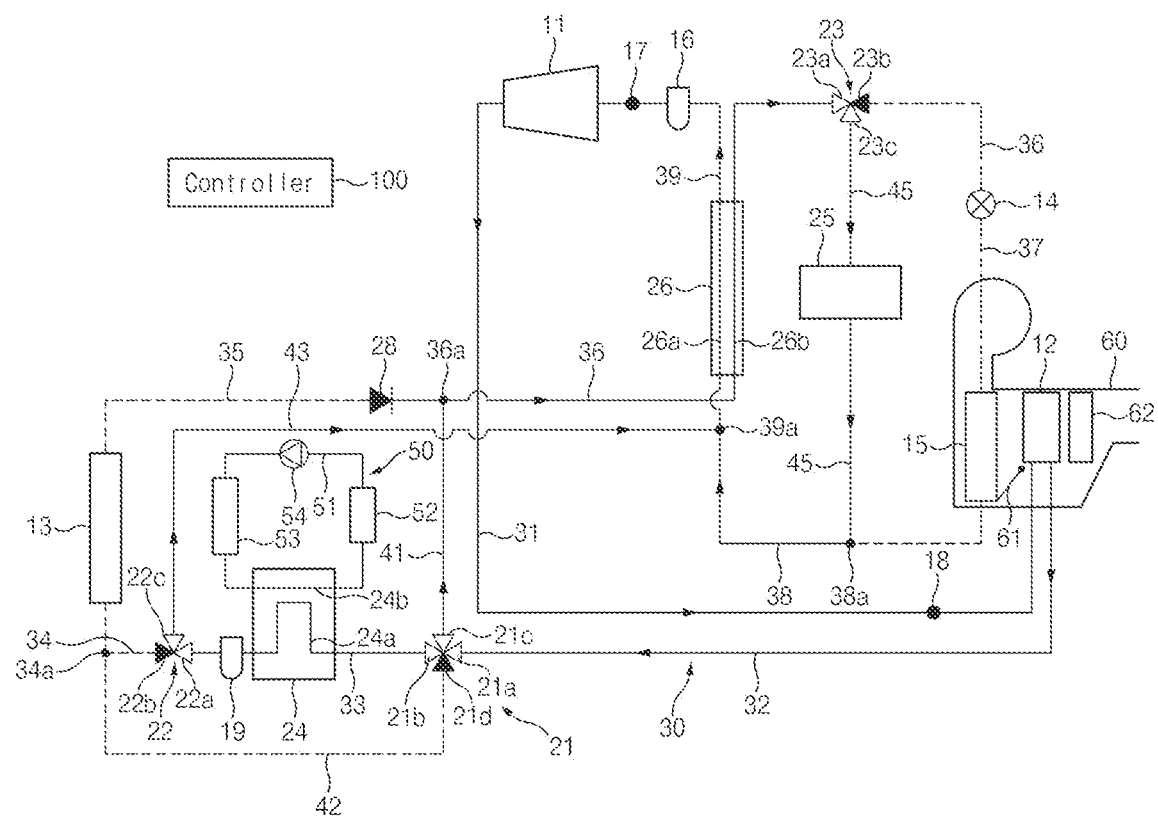
FIG. 3 illustrates the flow of a refrigerant when a vehicle HVAC system according to an exemplary embodiment of the present disclosure operates in a heating boost mode or heating enhanced mode.
Figure 4:
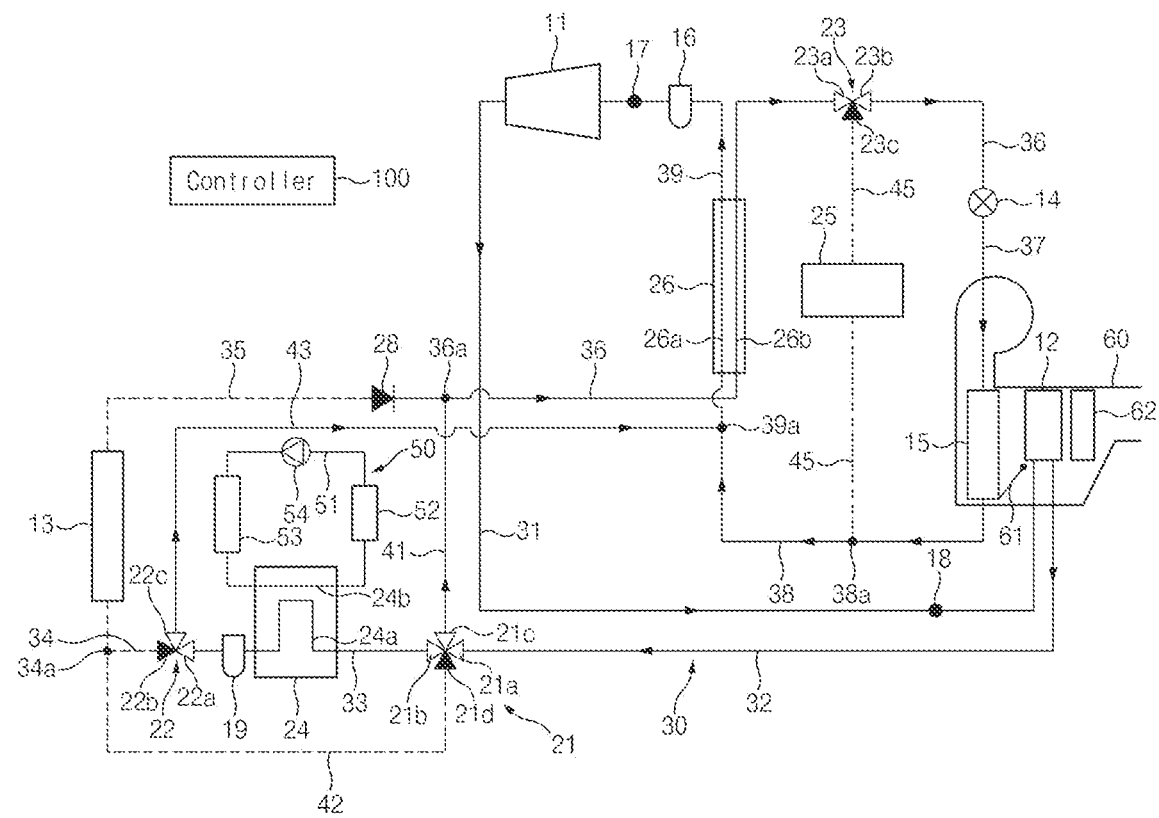
FIG. 4 illustrates the flow of a refrigerant when a vehicle HVAC system according to an exemplary embodiment of the present disclosure operates in a heating and dehumidification mode.
Figure 5:
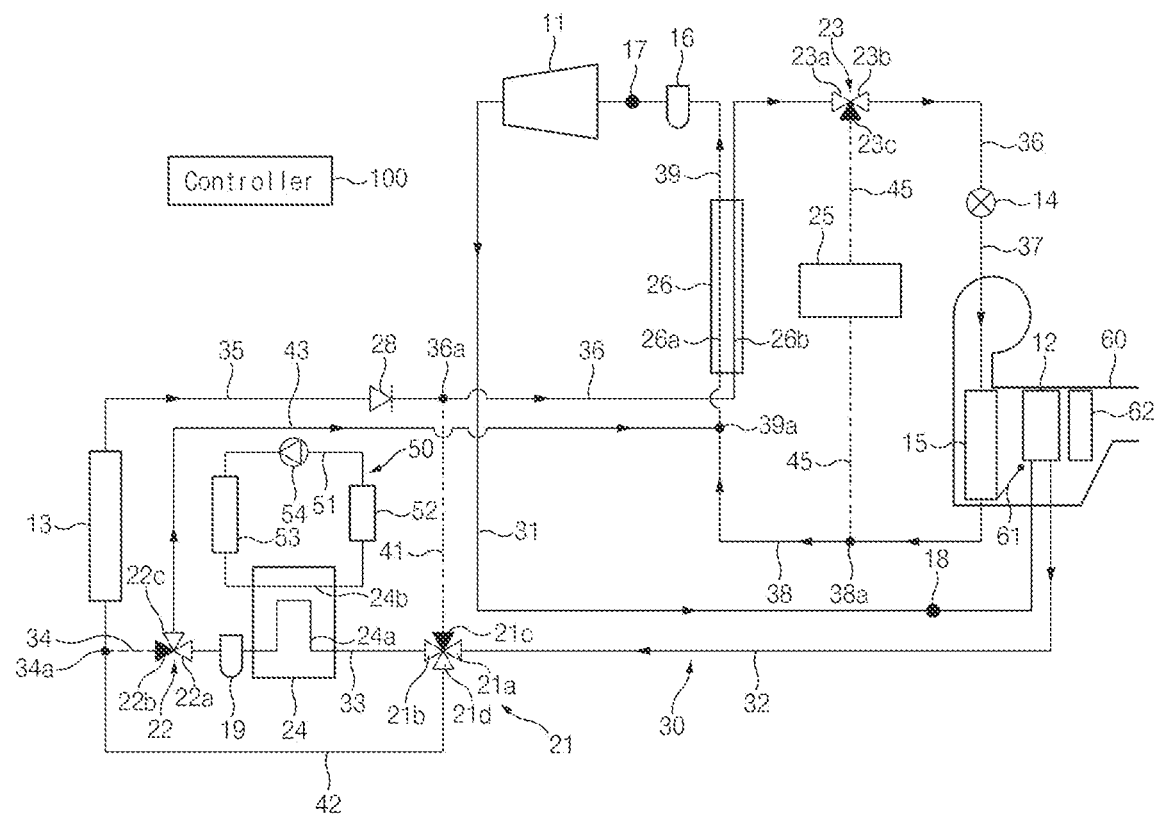
FIG. 5 illustrates the flow of a refrigerant when a vehicle HVAC system according to an exemplary embodiment of the present disclosure operates in a heating and dehumidification boost mode or heating and dehumidification enhanced mode.

The opening degree of the second outlet port 23c may be adjusted based on the pressure (the suction pressure of the compressor 11) and temperature (the suction temperature of the compressor 11) of the low-pressure refrigerant sensed by the low-pressure refrigerant sensor 17. That is, the opening degree of the second outlet port 23c may be adjusted to correspond to the suction pressure and suction temperature of the compressor 11 so that the refrigerant discharged from the second outlet port 23c may be expanded, and the pressure and temperature of the refrigerant discharged from the second outlet port 23c may be reduced to be substantially equal to the pressure and temperature of the low-pressure refrigerant discharged from the first passage 24a of the water-cooled heat exchanger 24. Referring to FIGS. 3 to 5, when the low-pressure refrigerant discharged from the first passage 24a of the water-cooled heat exchanger 24 and the refrigerant discharged from the second outlet port 23c of the third control valve 23 are joined at a junction 39a located on the upstream side of the first passage 26a of the refrigerant heat exchanger 26, the opening degree of the second outlet port 23c may be adjusted to correspond to the pressure and temperature of the low-pressure refrigerant sensed by the low-pressure refrigerant sensor 17 so that the pressure and temperature of the refrigerant discharged from the second outlet port 23c may be similar or equal to the pressure and temperature of the low-pressure refrigerant discharged from the first passage 24a of the water-cooled heat exchanger 24.

In addition, when the HVAC system operates in a battery cooling mode for cooling the battery, the opening degree of the second outlet port 23c may be adjusted based on the temperature of the battery so that the second outlet port 23c may serve as a chiller-side expansion valve that expands the refrigerant passing through the battery chiller 25. When the opening degree of the second outlet port 23c is adjusted, the refrigerant may be expanded at the second outlet port 23c, and the expanded refrigerant may be directed to the battery chiller 25. As the opening degree of the second outlet port 23c is adjusted, the refrigerant discharged from the second outlet port 23c may be expanded, and accordingly the pressure and temperature of the refrigerant discharged from the second outlet port 23c may be reduced. In addition, the second outlet port 23c may be fully opened or be fully closed. When the second outlet port 23c is fully opened, the refrigerant may be directed to the battery chiller 25 without expanding.

Referring to FIG. 1, the inlet of the first passage 26a of the refrigerant heat exchanger 26 may be located on the downstream side of the third bypass line 43 and the downstream side of the evaporator 15, and the outlet of the first passage 26a of the refrigerant heat exchanger 26 may be located on the upstream side of the compressor 11. The inlet of the second passage 26b of the refrigerant heat exchanger 26 may be located on the downstream side of the exterior heat exchanger 13 and the downstream side of the first bypass line 41, and the outlet of the second passage 26b of the refrigerant heat exchanger 26 may be located on the upstream side of the cooling-side expansion valve 14.

Referring to FIG. 1, the refrigerant circulation path 30 may include a first line 31 extending from the outlet of the compressor 11 to the interior condenser 12, a second line 32 extending from the interior condenser 12 to the first control valve 21, a third line 33 extending from the first outlet port 21b of the first control valve 21 to the inlet port 22a of the second control valve 22, a fourth line 34 extending from the first outlet port 22b of the second control valve 22 to the inlet of the exterior heat exchanger 13, a fifth line 35 connected to the outlet of the exterior heat exchanger 13, a sixth line 36 extending from the fifth line 35 to the inlet of the cooling-side expansion valve 14, a seventh line 37 extending from an outlet of the cooling-side expansion valve 14 to an inlet of the evaporator 15, an eighth line 38 connected to the outlet of the evaporator 15, and a ninth line 39 extending from the eighth line 38 to the inlet of the compressor 11.

The first bypass line 41 and the fifth line 35 may be connected to a junction 36a of the sixth line 36, and the first bypass line 41 may extend from the second outlet port 21c of the first control valve 21 to the junction 36a of the sixth line 36 located on the upstream side of the refrigerant heat exchanger 26. The junction 36a of the sixth line 36 may be located on the upstream side of the second passage 26b of the refrigerant heat exchanger 26. Accordingly, the first bypass line 41 may be fluidly connected to the second passage 26b of the refrigerant heat exchanger 26 through the sixth line 36.

The second bypass line 42 may be connected to the fourth line 34, and the second bypass line 42 may extend from the third outlet port 21d of the first control valve 21 to a junction 34a of the fourth line 34 located on the downstream side of the first outlet port 22b of the second control valve 22. The junction 34a of the fourth line 34 may be located between the first outlet port 22b of the second control valve 22 and the inlet of the exterior heat exchanger 13. Accordingly, the second bypass line 42 may be fluidly connected to the exterior heat exchanger 13 through the fourth line 34.

The third bypass line 43 and the eighth line 38 may be connected to a junction 39a of the ninth line 39, and the third bypass line 43 may extend from the second outlet port 22c of the second control valve 22 to the junction 39a of the ninth line 39. The junction 39a of the ninth line 39 may be located on the upstream side of the first passage 26a of the refrigerant heat exchanger 26. Accordingly, the third bypass line 43 may be fluidly connected to the first passage 26a of the refrigerant heat exchanger 26 through the ninth line 39.

The distribution line 45 may extend from the second outlet port 23c of the third control valve 23 to a junction 38a of the eighth line 38. The junction 38a of the eighth line 38 may be located between the junction 39a of the ninth line 39 and the outlet of the evaporator 15.

The HVAC system may further include a check valve 28 disposed between the outlet of the exterior heat exchanger 13 and the second passage 26b of the refrigerant heat exchanger 26. The check valve 28 may be located on the upstream side of the junction 36a of the sixth line 36. The check valve 28 may be configured to allow the refrigerant to flow from the exterior heat exchanger 13 to the second passage 26b of the refrigerant heat exchanger 26, and prevent the refrigerant from flowing backward from the second passage 26b of the refrigerant heat exchanger 26 to the exterior heat exchanger 13.

The controller 100 may be configured to control respective operations of the compressor 11, the first control valve 21, the second control valve 22, and the third control valve 23, and thus the overall operation of the HVAC system may be controlled by the controller 100.

Figure 2:
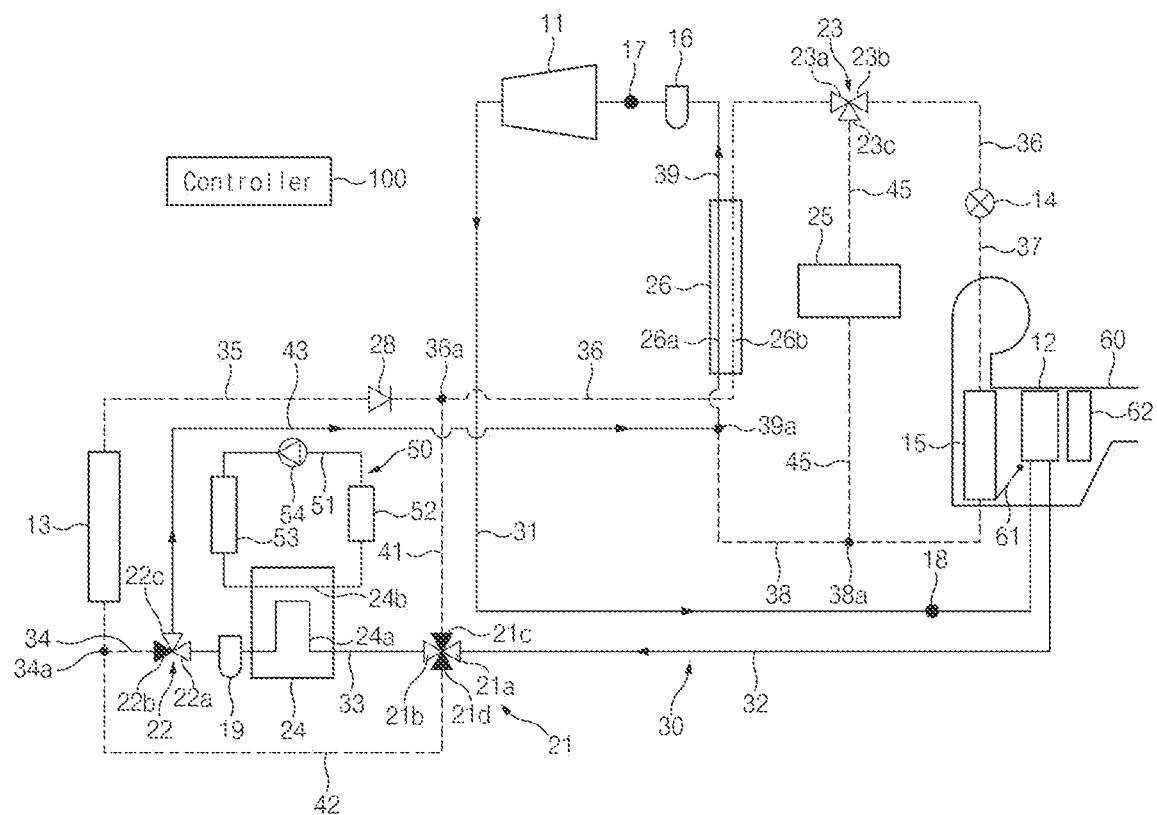
FIG. 2 illustrates the flow of a refrigerant when a vehicle HVAC system according to an exemplary embodiment of the present disclosure operates in a heating mode.

FIG. 2 illustrates the flow of the refrigerant when the HVAC system according to an exemplary embodiment of the present disclosure operates in a heating mode. Referring to FIG. 2, as the compressor 11 operates at predetermined RPM, the compressor 11 may compress the refrigerant, and the refrigerant discharged from the outlet of the compressor 11 may be in high temperature and high pressure state. The RPM of the compressor 11 may be controlled based on the pressure (the discharge pressure of the compressor 11) and temperature (the discharge temperature of the compressor 11) of the high-pressure refrigerant sensed by the high-pressure refrigerant sensor 18, a duty cycle (or RPM) of the air blower, a vehicle speed, and the like.

The refrigerant compressed by the compressor 11 may be directed to the interior condenser 12, and the interior condenser 12 may be cooled by the air passing through the HVAC case 60 so that the refrigerant passing through the interior condenser 12 may be condensed by the air, and the air may be heated.

The opening degree of the first outlet port 21b of the first control valve 21 may be adjusted based on the pressure (the discharge pressure of the compressor 11) and temperature (the discharge temperature of the compressor 11) of the high-pressure refrigerant sensed by the high-pressure refrigerant sensor 18 so that the refrigerant discharged from the first outlet port 21b may be expanded. The refrigerant discharged from the first outlet port 21b of the first control valve 21 may be directed to the first passage 24a of the water-cooled heat exchanger 24, and the refrigerant passing through the first passage 24a of the water-cooled heat exchanger 24 may absorb heat from the coolant passing through the second passage 24b of the water-cooled heat exchanger 24, and accordingly the refrigerant may be evaporated in the water-cooled heat exchanger 24.

The first outlet port 22b of the second control valve 22 may be closed, and the second outlet port 22c of the second control valve 22 may be opened so that the refrigerant discharged from the first passage 24a of the water-cooled heat exchanger 24 may be directed to the first passage 26a of the refrigerant heat exchanger 26 through the third bypass line 43.

When the ambient temperature is relatively low, and the temperature of the coolant is relatively low, the evaporation of the refrigerant in the water-cooled heat exchanger 24 may be insufficient. In order to improve heating efficiency of the HVAC system, an additional heat source for sufficient evaporation of the refrigerant may be required. Accordingly, the HVAC system may need to operate in a heating boost mode or heating enhanced mode.

FIG. 3 illustrates the flow of the refrigerant when the HVAC system according to an exemplary embodiment of the present disclosure operates in a heating boost mode or heating enhanced mode. Referring to FIG. 3, as the compressor 11 operates at predetermined RPM, the compressor 11 may compress the refrigerant, and the refrigerant discharged from the outlet of the compressor 11 may be in high temperature and high pressure state. The RPM of the compressor 11 may be controlled based on the pressure (the discharge pressure of the compressor 11) and temperature (the discharge temperature of the compressor 11) of the high-pressure refrigerant sensed by the high-pressure refrigerant sensor 18, a duty cycle (or RPM) of the air blower, a vehicle speed, and the like.

The refrigerant compressed by the compressor 11 may be directed to the interior condenser 12, and the interior condenser 12 may be cooled by the air passing through the HVAC case 60 so that the refrigerant passing through the interior condenser 12 may be condensed by the air, and the air may be heated. The temperature and pressure of the refrigerant discharged from the interior condenser 12 may be lower than the temperature and pressure of the refrigerant discharged from the compressor 11, but the temperature and pressure of the refrigerant discharged from the interior condenser 12 may still be high.

The opening degree of the first outlet port 21b of the first control valve 21 may be adjusted based on the discharge pressure and discharge temperature of the compressor 11, and the second outlet port 21c of the first control valve 21 may be opened. Accordingly, the refrigerant discharged from the interior condenser 12 may be distributed to the water-cooled heat exchanger 24 and the refrigerant heat exchanger 26 through the first outlet port 21b and the second outlet port 21c of the first control valve 21.

The opening degree of the first outlet port 21b of the first control valve 21 may be adjusted based on the pressure (the discharge pressure of the compressor 11) and temperature (the discharge temperature of the compressor 11) of the high-pressure refrigerant sensed by the high-pressure refrigerant sensor 18 so that the refrigerant discharged from the first outlet port 21b may be expanded. The pressure and temperature of the refrigerant discharged from the first outlet port 21b may be relatively reduced by the expansion of the refrigerant, compared to the pressure and temperature of the refrigerant flowing into the inlet port 21a. The refrigerant discharged from the first outlet port 21b may pass through the first passage 24a of the water-cooled heat exchanger 24, and the coolant of the coolant system 50 may pass through the second passage 24b of the water-cooled heat exchanger 24. The refrigerant passing through the first passage 24a of the water-cooled heat exchanger 24 may absorb heat from the coolant passing through the second passage 24b of the water-cooled heat exchanger 24 so that the refrigerant may be primarily evaporated by the water-cooled heat exchanger 24.

The first outlet port 22b of the second control valve 22 may be closed, and the second outlet port 22c of the second control valve 22 may be opened so that the refrigerant discharged from the first passage 24a of the water-cooled heat exchanger 24 may be directed to the first passage 26a of the refrigerant heat exchanger 26 through the third bypass line 43.

The second outlet port 21c of the first control valve 21 may be opened so that a portion of the refrigerant discharged from the interior condenser 12 may be directed to the second passage 26b of the refrigerant heat exchanger 26 through the second outlet port 21c of the first control valve 21. Since the refrigerant discharged from the second outlet port 21c of the first control valve 21 is not expanded, the pressure and temperature of the refrigerant discharged from the second outlet port 21c may be maintained the same as the pressure and temperature of the refrigerant flowing into the inlet port 21a. Accordingly, the pressure and temperature of the refrigerant discharged from the second outlet port 21c may be higher than the pressure and temperature of the refrigerant discharged from the first outlet port 21b. The refrigerant discharged from the second outlet port 21c may be directed to the second passage 26b of the refrigerant heat exchanger 26 through the first bypass line 41 and the sixth line 36.

Since the temperature and pressure of the refrigerant passing through the second passage 26b of the refrigerant heat exchanger 26 are higher than the temperature and pressure of the refrigerant passing through the first passage 26a of the refrigerant heat exchanger 26, the refrigerant passing through the first passage 26a may absorb heat from the refrigerant passing through the second passage 26b so that the refrigerant passing through the first passage 26a may be secondarily evaporated, and at the same time, the refrigerant passing through the second passage 26b may be secondarily condensed. The refrigerant discharged from the first passage 26a of the refrigerant heat exchanger 26 may be directed to the compressor 11 after passing through the accumulator 16, and the refrigerant discharged from the second passage 26b of the refrigerant heat exchanger 26 may be directed to the first passage 26a of the refrigerant heat exchanger 26 through the third control valve 23 and the distribution line 45.

The first outlet port 23b of the third control valve 23 may be closed, and the second outlet port 23c of the third control valve 23 may be opened to a predetermined degree so that the refrigerant discharged from the second passage 26b of the refrigerant heat exchanger 26 may be directed to the first passage 26a of the refrigerant heat exchanger 26 through the second outlet port 23c of the third control valve 23 and the distribution line 45.

The opening degree of the second outlet port 23c of the third control valve 23 may be adjusted to correspond to the pressure (the suction pressure of the compressor 11) and temperature (the suction temperature of the compressor 11) of the low-pressure refrigerant sensed by the low-pressure refrigerant sensor 17 so that the refrigerant discharged from the second outlet port 23c of the third control valve 23 may be expanded, and the pressure and temperature of the refrigerant discharged from the second outlet port 23c may be reduced to be substantially equal to the pressure and temperature of the low-pressure refrigerant discharged from the first passage 24a of the water-cooled heat exchanger 24. When the low-pressure refrigerant discharged from the first passage 24a of the water-cooled heat exchanger 24 and the refrigerant discharged from the second outlet port 23c of the third control valve 23 are joined at the junction 39a located on the upstream side of the first passage 26a of the refrigerant heat exchanger 26, the opening degree of the second outlet port 23c may be adjusted to correspond to the pressure and temperature of the low-pressure refrigerant sensed by the low-pressure refrigerant sensor 17 so that the pressure and temperature of the refrigerant discharged from the second outlet port 23c may be similar or equal to the pressure and temperature of the low-pressure refrigerant discharged from the first passage 24a of the water-cooled heat exchanger 24. The refrigerant discharged from the second outlet port 23c of the third control valve 23 may pass through the battery chiller 25, be joined to the refrigerant discharged from the first passage 24a of the water-cooled heat exchanger 24 at the junction 39a, and then be directed to the compressor 11 through the first passage 26a of the refrigerant heat exchanger 26.

When the HVAC system operates in the heating mode in a condition in which the ambient temperature is relatively low (for example, −20° C.--5° C.), the temperature of the coolant circulating in the coolant circulation path 51 of the coolant system 50 may not be relatively high, so the refrigerant passing through the first passage 24a of the water-cooled heat exchanger 24 may fail to sufficiently absorb heat from the second passage 24b of the water-cooled heat exchanger 24. Accordingly, the refrigerant may not be sufficiently evaporated in the water-cooled heat exchanger 24. That is, in the condition in which the ambient temperature is relatively low, the coolant of the coolant system 50 may fail to provide enough heat for the evaporation of the refrigerant passing through the water-cooled heat exchanger 24. To deal with this, the HVAC system according to an exemplary embodiment of the present disclosure may allow the refrigerant heat exchanger to additionally provide heat for the evaporation of the refrigerant in the condition in which the ambient temperature is relatively low. Accordingly, the refrigerant may be evaporated in two steps through the water-cooled heat exchanger 24 and the refrigerant heat exchanger 26, whereby the refrigerant may be sufficiently evaporated. As described above, the refrigerant may be primarily evaporated by the water-cooled heat exchanger 24, and be secondarily evaporated by the refrigerant heat exchanger 26. Accordingly, as the evaporation of the refrigerant is sufficiently performed, the suction pressure of the compressor may be prevented from being lowered below a predetermined threshold pressure, and the compressor may operate at the predetermined RPM so that efficiency of the compressor may be improved. Since the coefficient of performance (COP) of the HVAC system may be improved with the use of the refrigerant, the operation of the electric heater may be minimized. Thus, electric efficiency of the electric vehicle may be improved.

When the HVAC system operates in the heating and dehumidification mode in a condition in which the ambient temperature is relatively low (for example, −20° C.--5° C.), the refrigerant may pass through the cooling-side expansion valve 14 and the evaporator 15, and the air passing by the evaporator 15 may be dehumidified.

FIG. 4 illustrates the flow of the refrigerant when the HVAC system according to an exemplary embodiment of the present disclosure operates in a heating and dehumidification mode. Referring to FIG. 4, as the compressor 11 operates at predetermined RPM, the compressor 11 may compress the refrigerant, and the refrigerant discharged from the outlet of the compressor 11 may be in high temperature and high pressure state. The RPM of the compressor 11 may be controlled based on the pressure (the discharge pressure of the compressor 11) and temperature (the discharge temperature of the compressor 11) of the high-pressure refrigerant sensed by the high-pressure refrigerant sensor 18, a duty cycle (or RPM) of the air blower, a vehicle speed, and the like.

The refrigerant compressed by the compressor 11 may be directed to the interior condenser 12, and the interior condenser 12 may be cooled by the air passing through the HVAC case 60 so that the refrigerant passing through the interior condenser 12 may be condensed by the air, and the air may be heated. The temperature and pressure of the refrigerant discharged from the interior condenser 12 may be lower than the temperature and pressure of the refrigerant discharged from the compressor 11, but the temperature and pressure of the refrigerant discharged from the interior condenser 12 may still be high.

The opening degree of the first outlet port 21b of the first control valve 21 may be adjusted based on the discharge pressure and discharge temperature of the compressor 11, and the second outlet port 21c of the first control valve 21 may be opened. Accordingly, the refrigerant discharged from the interior condenser 12 may be distributed to the water-cooled heat exchanger 24 and the refrigerant heat exchanger 26 through the first outlet port 21b and the second outlet port 21c of the first control valve 21.

The opening degree of the first outlet port 21b of the first control valve 21 may be adjusted based on the pressure (the discharge pressure of the compressor 11) and temperature (the discharge temperature of the compressor 11) of the high-pressure refrigerant sensed by the high-pressure refrigerant sensor 18 so that the refrigerant discharged from the first outlet port 21b may be expanded. The pressure and temperature of the refrigerant discharged from the first outlet port 21b may be relatively reduced by the expansion of the refrigerant, compared to the pressure and temperature of the refrigerant flowing into the inlet port 21a. The refrigerant discharged from the first outlet port 21b may pass through the first passage 24a of the water-cooled heat exchanger 24, and the coolant of the coolant system 50 may pass through the second passage 24b of the water-cooled heat exchanger 24. The refrigerant passing through the first passage 24a of the water-cooled heat exchanger 24 may absorb heat from the coolant passing through the second passage 24b of the water-cooled heat exchanger 24 so that the refrigerant may be primarily evaporated by the water-cooled heat exchanger 24.

The first outlet port 22b of the second control valve 22 may be closed, and the second outlet port 22c of the second control valve 22 may be opened so that the refrigerant discharged from the first passage 24a of the water-cooled heat exchanger 24 may be directed to the first passage 26a of the refrigerant heat exchanger 26 through the third bypass line 43.

The second outlet port 21c of the first control valve 21 may be opened so that a portion of the refrigerant discharged from the interior condenser 12 may be directed to the second passage 26b of the refrigerant heat exchanger 26 through the second outlet port 21c of the first control valve 21. Since the refrigerant discharged from the second outlet port 21c of the first control valve 21 is not expanded, the pressure and temperature of the refrigerant discharged from the second outlet port 21c may be maintained the same as the pressure and temperature of the refrigerant flowing into the inlet port 21a. Accordingly, the temperature and pressure of the refrigerant discharged from the second outlet port 21c may be higher than the temperature and pressure of the refrigerant discharged from the first outlet port 21b. The refrigerant discharged from the second outlet port 21c may be directed to the second passage 26b of the refrigerant heat exchanger 26 through the first bypass line 41 and the sixth line 36.

Since the temperature and pressure of the refrigerant passing through the second passage 26b of the refrigerant heat exchanger 26 are higher than the temperature and pressure of the refrigerant passing through the first passage 26a of the refrigerant heat exchanger 26, the refrigerant passing through the first passage 26a may absorb heat from the refrigerant passing through the second passage 26b so that the refrigerant passing through the first passage 26a may be secondarily evaporated, and at the same time, the refrigerant passing through the second passage 26b may be secondarily condensed. That is, the refrigerant primarily evaporated by the water-cooled heat exchanger 24 may be secondarily evaporated by the refrigerant heat exchanger 26 so that the evaporation of the refrigerant may be sufficiently performed, and the refrigerant primarily condensed by the interior condenser 12 may be secondarily condensed by the refrigerant heat exchanger 26 so that the condensation of the refrigerant may be sufficiently performed.

The refrigerant discharged from the first passage 26a of the refrigerant heat exchanger 26 may be directed to the compressor 11 after passing through the accumulator 16. The second outlet port 23c of the third control valve 23 may be closed, and the first outlet port 23b of the third control valve 23 may be opened to a predetermined degree so that the refrigerant discharged from the second passage 26b of the refrigerant heat exchanger 26 may be directed to the cooling-side expansion valve 14 through the first outlet port 23b of the third control valve 23.

The opening degree of the first outlet port 23b of the third control valve 23 may be adjusted based on the pressure (the discharge pressure of the compressor 11) and temperature (the discharge temperature of the compressor 11) of the high-pressure refrigerant sensed by the high-pressure refrigerant sensor 18 so that the refrigerant discharged from the second passage 26b of the refrigerant heat exchanger 26 may be primarily expanded at the first outlet port 23b of the third control valve 23. The refrigerant discharged from the first outlet port 23b may be directed to the cooling-side expansion valve 14, and the refrigerant may be secondarily expanded at the cooling-side expansion valve 14. The secondarily expanded refrigerant may be evaporated in the evaporator 15, and the air passing by an exterior surface of the evaporator 15 may be cooled and dehumidified. The refrigerant discharged from the evaporator 15 and the refrigerant discharged from the first passage 24a of the water-cooled heat exchanger 24 may be joined at the junction 39a, and then be directed to the compressor 11 through the first passage 26a of the refrigerant heat exchanger 26.

When an interior temperature of the passenger compartment reaches a target temperature, the duty cycle (or RPM) of the air blower may be relatively reduced so that the rate of air blown into the passenger compartment may be relatively reduced. As the rate of the blown air is relatively reduced, the interior condenser of the HVAC system may fail to sufficiently release heat to the air, and thus the condensation of the refrigerant may be relatively reduced. Accordingly, the HVAC system may need to operate in a dehumidification boost mode or dehumidification enhanced mode.

FIG. 5 illustrates the flow of the refrigerant when the HVAC system according to an exemplary embodiment of the present disclosure operates in a heating and dehumidification boost mode or heating and dehumidification enhanced mode. Referring to FIG. 5, as the compressor 11 operates at predetermined RPM, the compressor 11 may compress the refrigerant, and the refrigerant discharged from the outlet of the compressor 11 may be in high temperature and high pressure state. The RPM of the compressor 11 may be controlled based on the pressure (the discharge pressure of the compressor 11) and temperature (the discharge temperature of the compressor 11) of the high-pressure refrigerant sensed by the high-pressure refrigerant sensor 18, a duty cycle (or RPM) of the air blower, a vehicle speed, and the like.

The refrigerant compressed by the compressor 11 may be directed to the interior condenser 12, and the interior condenser 12 may be cooled by the air passing through the HVAC case 60 so that the refrigerant passing through the interior condenser 12 may be primarily condensed by the air, and the air may be heated. The temperature and pressure of the refrigerant discharged from the interior condenser 12 may be lower than the temperature and pressure of the refrigerant discharged from the compressor 11, but the temperature and pressure of the refrigerant discharged from the interior condenser 12 may still be high.

The opening degree of the first outlet port 21b of the first control valve 21 may be adjusted based on the discharge pressure and discharge temperature of the compressor 11, the second outlet port 21c of the first control valve 21 may be closed, and the third outlet port 21d of the first control valve 21 may be opened. Accordingly, the refrigerant discharged from the interior condenser 12 may be distributed to the water-cooled heat exchanger 24 and the exterior heat exchanger 13 through the first outlet port 21b and the third outlet port 21d of the first control valve 21.

The opening degree of the first outlet port 21b of the first control valve 21 may be adjusted based on the pressure (the suction pressure of the compressor 11) and temperature (the suction temperature of the compressor 11) of the high-pressure refrigerant sensed by the high-pressure refrigerant sensor 18 so that the refrigerant discharged from the first outlet port 21b may be expanded. The pressure and temperature of the refrigerant discharged from the first outlet port 21b may be relatively reduced by the expansion of the refrigerant, compared to the pressure and temperature of the refrigerant flowing into the inlet port 21a. The refrigerant discharged from the first outlet port 21b may pass through the first passage 24a of the water-cooled heat exchanger 24, and the coolant of the coolant system 50 may pass through the second passage 24b of the water-cooled heat exchanger 24. The refrigerant passing through the first passage 24a of the water-cooled heat exchanger 24 may absorb heat from the coolant passing through the second passage 24b of the water-cooled heat exchanger 24 so that the refrigerant may be primarily evaporated by the water-cooled heat exchanger 24.

The first outlet port 22b of the second control valve 22 may be closed, and the second outlet port 22c of the second control valve 22 may be opened so that the refrigerant discharged from the first passage 24a of the water-cooled heat exchanger 24 may be directed to the first passage 26a of the refrigerant heat exchanger 26 through the third bypass line 43.

The third outlet port 21d of the first control valve 21 may be opened so that a portion of the refrigerant discharged from the interior condenser 12 may be directed to the exterior heat exchanger 13 through the third outlet port 21d of the first control valve 21 and the second bypass line 42. The refrigerant passing through the internal refrigerant passage of the exterior heat exchanger 13 may be secondarily condensed by the ambient air passing by the exterior surface of the evaporator 15.

The refrigerant discharged from the exterior heat exchanger 13 may be directed to the second passage 26b of the refrigerant heat exchanger 26 through the fifth line 35 and the sixth line 36. Since the temperature and pressure of the refrigerant secondarily condensed by the exterior heat exchanger 13 are higher than the temperature and pressure of the refrigerant evaporated by the water-cooled heat exchanger 24, the refrigerant passing through the second passage 26b of the refrigerant heat exchanger 26 may release heat to the refrigerant passing through the first passage 26a of the refrigerant heat exchanger 26 so that the refrigerant secondarily condensed by the exterior heat exchanger 13 may then be condensed by the refrigerant heat exchanger 26. That is, the refrigerant may be primarily condensed by the interior condenser 12, be secondarily condensed by the exterior heat exchanger 13, and then condensed by the refrigerant heat exchanger 26, and thus subcooling of the refrigerant may be sufficiently performed. As the subcooling of the refrigerant is sufficiently performed, the heating and dehumidification of the passenger compartment may be stably performed with the use of the refrigerant. Accordingly, the operation of the electric heater 62 may be minimized, and thus the electric efficiency of the electric vehicle may be improved.

The second outlet port 23c of the third control valve 23 may be closed, and the opening degree of the first outlet port 23b of the third control valve 23 may be adjusted based on the pressure (the discharge pressure of the compressor 11) and temperature (the discharge temperature of the compressor 11) of the high-pressure refrigerant sensed by the high-pressure refrigerant sensor 18 so that the refrigerant discharged from the first outlet port 23b may be primarily expanded. The refrigerant discharged from the first outlet port 23b may be directed to the cooling-side expansion valve 14, and the refrigerant may be secondarily expanded at the cooling-side expansion valve 14. The secondarily expanded refrigerant may be directed to the evaporator 15 so that the refrigerant may be evaporated in the evaporator 15, and the air passing by the exterior surface of the evaporator 15 may be cooled and dehumidified. The refrigerant discharged from the evaporator 15 and the refrigerant discharged from the first passage 24a of the water-cooled heat exchanger 24 may be joined at the junction 39a, and then be directed to the compressor 11 through the first passage 26a of the refrigerant heat exchanger 26.

As set forth above, according to exemplary embodiments of the present disclosure, when the HVAC system operates in the heating boost mode, the refrigerant may be evaporated twice through the water-cooled heat exchanger and the refrigerant heat exchanger. As the evaporation of the refrigerant is stably performed, the suction pressure of the compressor may be prevented from being lowered below the threshold pressure, and the compressor may operate at the predetermined RPM, and accordingly the efficiency of the compressor may be improved. Since the coefficient of performance (COP) of the HVAC system may be improved using the refrigerant, the operation of the electric heater may be minimized, and thus the electric efficiency of the electric vehicle may be improved.

According to exemplary embodiments of the present disclosure, when the HVAC system operates in the heating and dehumidification boost mode, the refrigerant may be condensed three times through the interior condenser, the exterior heat exchanger 13, and the refrigerant heat exchanger. As the condensation of the refrigerant is stably performed, the heating and dehumidification of the passenger compartment may be smoothly performed. Accordingly, the operation of the electric heater may be minimized, and thus the electric efficiency of the electric vehicle may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A vehicle heating, ventilation, and air conditioning (HVAC) system, comprising:
   a compressor;
   an interior condenser positioned on a downstream side of the compressor;
   a water-cooled heat exchanger positioned on a downstream side of the interior condenser, the water-cooled heat exchanger being configured to transfer heat between a refrigerant and a coolant circulating in a coolant system;
   an exterior heat exchanger positioned on a downstream side of the water-cooled heat exchanger, the exterior heat exchanger being configured to transfer heat between the refrigerant and ambient air;
   a refrigerant heat exchanger configured to transfer heat between the refrigerant discharged from the water-cooled heat exchanger and the refrigerant discharged from the interior condenser; and
   a first control valve located between the water-cooled heat exchanger and the interior condenser, the first control valve being configured to allow the refrigerant discharged from the interior condenser to be directed to at least one of the water-cooled heat exchanger, the refrigerant heat exchanger, and the exterior heat exchanger.

2. The vehicle HVAC system according to claim 1, wherein the refrigerant heat exchanger includes:
   a first passage through which the refrigerant discharged from the water-cooled heat exchanger passes; and
   a second passage through which the refrigerant discharged from at least one of the interior condenser and the exterior heat exchanger passes.

3. The vehicle HVAC system according to claim 2, further comprising a first bypass line configured to allow at least a portion of the refrigerant discharged from the interior condenser to be directed from an upstream point of the water-cooled heat exchanger to a downstream point of the exterior heat exchanger, wherein the first bypass line is fluidly connected to the second passage of the refrigerant heat exchanger.

4. The vehicle HVAC system according to claim 3, further comprising a second bypass line configured to allow at least a portion of the refrigerant discharged from the interior condenser to be directed from the upstream point of the water-cooled heat exchanger to an upstream point of the exterior heat exchanger, wherein the second bypass line is fluidly connected to an inlet of the exterior heat exchanger.

5. The vehicle HVAC system according to claim 4, wherein the first control valve includes:
- an inlet port communicating with the interior condenser;
- a first outlet port communicating with the water-cooled heat exchanger;
- a second outlet port communicating with the first bypass line; and
- a third outlet port communicating with the second bypass line.

6. The vehicle HVAC system according to claim 5, wherein the opening degree of the first outlet port is adjusted based on a discharge pressure and a discharge temperature of the compressor.

7. The vehicle HVAC system according to claim 2, further comprising a third bypass line configured to allow at least a portion of the refrigerant discharged from the water-cooled heat exchanger to be directed from an upstream point of the exterior heat exchanger to an upstream point of the compressor, wherein the third bypass line is fluidly connected to an inlet of the first passage of the refrigerant heat exchanger.

8. The vehicle HVAC system according to claim 7, further comprising a second control valve configured to allow the refrigerant discharged from the water-cooled heat exchanger to be directed to at least one of the exterior heat exchanger and the first passage of the refrigerant heat exchanger.

9. The vehicle HVAC system according to claim 8, wherein the second control valve includes:
- an inlet port communicating with the water-cooled heat exchanger;
- a first outlet port communicating with the exterior heat exchanger; and
- a second outlet port communicating with the third bypass line.

10. The vehicle HVAC system according to claim 2, further comprising a check valve positioned between the exterior heat exchanger and the second passage of the refrigerant heat exchanger, wherein the check valve is configured to allow the refrigerant to flow from the exterior heat exchanger to the second passage of the refrigerant heat exchanger, and to prevent the refrigerant from flowing backward from the second passage of the refrigerant heat exchanger to the exterior heat exchanger.

11. The vehicle HVAC system according to claim 2, further comprising:
- a cooling-side expansion valve positioned on a downstream side of the second passage of the refrigerant heat exchanger;
- an evaporator positioned on a downstream side of the cooling-side expansion valve;
- a distribution line configured to allow at least a portion of the refrigerant discharged from the second passage of the refrigerant heat exchanger to be directed from an upstream point of the cooling-side expansion valve to a downstream point of the evaporator; and
- a battery chiller fluidly connected to the distribution line, and thermally connected to a battery cooling system.

12. The vehicle HVAC system according to claim 11, further comprising a third control valve configured to allow the refrigerant discharged from the second passage of the refrigerant heat exchanger to be directed to at least one of the cooling-side expansion valve and the battery chiller.

13. The vehicle HVAC system according to claim 12, wherein the third control valve includes:
- an inlet port communicating with the second passage of the refrigerant heat exchanger;
- a first outlet port communicating with the cooling-side expansion valve; and
- a second outlet port communicating with the distribution line.

14. The vehicle HVAC system according to claim 13, wherein the opening degree of the first outlet port is adjusted based on a discharge pressure of the compressor.

15. The vehicle HVAC system according to claim 13, wherein the opening degree of the second outlet port is adjusted based on a suction pressure of the compressor.

\* \* \* \* \*